United States Patent [19]

Scantlin

[11] 3,858,032

[45] Dec. 31, 1974

[54] APPARATUS AND METHOD OF CODING INFORMATION

[75] Inventor: John R. Scantlin, Los Angeles, Calif.

[73] Assignee: Transaction Technology Inc., Los Angeles, Calif.

[22] Filed: May 25, 1973

[21] Appl. No.: 363,825

Related U.S. Application Data

[62] Division of Ser. No. 242,382, April 10, 1972.

[52] U.S. Cl. ...... 235/61.12 R, 40/312, 235/61.11 E, 235/61.11 R

[51] Int. Cl. ...... G06k 19/02, G06k 1/20, G09f 3/04

[58] Field of Search 235/61.12 R, 61.12 N, 61.11 E, 235/61.11 A, 61.7 B, 61.11 D; 340/149 A; 250/219 DC; 40/20, 312, 313

[56] References Cited

UNITED STATES PATENTS

| | | | |
|---|---|---|---|
| 3,238,357 | 3/1966 | Minka | 235/61.11 E |
| 3,275,806 | 9/1966 | Quinn | 235/61.12 R |
| 3,341,691 | 9/1967 | Modershon | 235/61.11 E |
| 3,461,305 | 8/1969 | Moulton | 250/219 DC |
| 3,474,232 | 10/1969 | Hearn | 235/61.11 E |
| 3,496,342 | 2/1970 | Milford | 235/61.11 E |

*Primary Examiner*—Daryl M. Cook
*Assistant Examiner*—Robert M. Kilgore
*Attorney, Agent, or Firm*—George F. Smyth

[57] ABSTRACT

An apparatus and method of recording and reproducing information on a recording medium including recording at least a first track of encloded data information and with the data information occuring at first regular intervals along the recording medium and recording a second track of clock information and with the clock information occurring at second regular intervals along the recording medium and with the second regular intervals occuring no more than every other one of the first regular intervals. The encloded data information on the first track is reproduced and stored and with the reproduction and storage controlled in accordance with the reproduction of the clock information in the second track. The second track of clock information is reproduced by at least a pair of spaced sensors for successively reproducing the clock information along the second track and with the reproduction of the clock information successively alternating between the sensors and wherein the reproduction and storage of the encloded data information is controlled by the successive alternating reproduction by the pair of sensors so that each portion of the encoded data information occurring at the first regular intervals is not reproduced and stored until both sensors have alternately reproduced clock information.

9 Claims, 8 Drawing Figures

Fig. 6 (Card Track Timing Diagram)
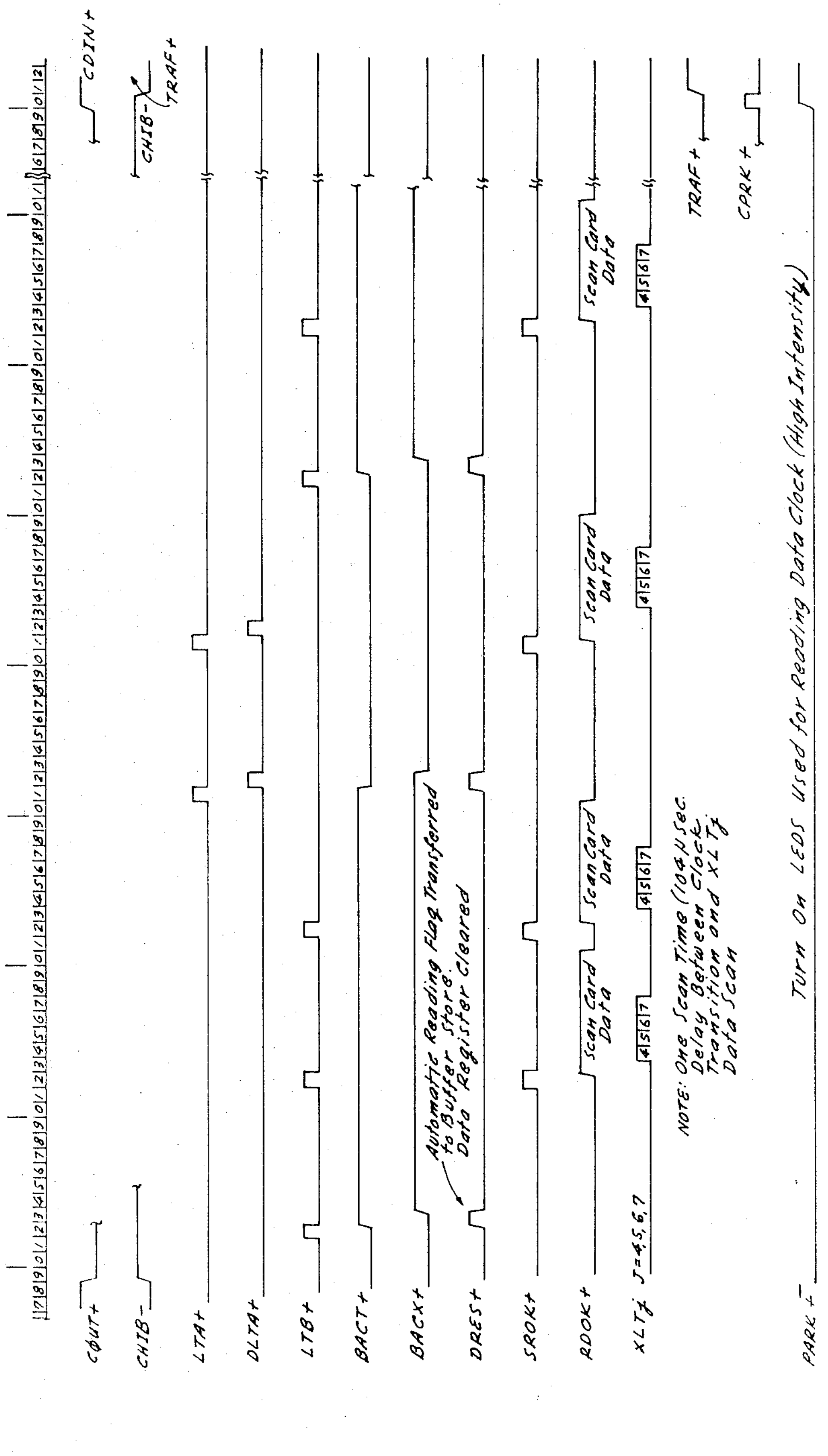

APPARATUS AND METHOD OF CODING INFORMATION

This is a division of application Ser. No. 242,382 filed on Apr. 10, 1972.

The present invention is directed to a method and apparatus for recording and reproducing encoded data information on a recording medium and using a track of clock information also recorded on the recording medium to control the reproduction of the data information. The present invention will be described with reference to the recording and reproducing of encoded data information on a credit card, but it is to be appreciated that each recording and reproducing may be provided on other types of recording media.

The credit card may be of the type which includes a plurality of discrete areas located along parallel tracks such as openings or spots forming areas of transmissivity different from the surrounding area, which discrete areas are representative of data information in binary form. In addition to the tracks of encoded data information, the credit card also includes at least one track of clock information. The tracks which store the encoded binary information may be four in number to thereby provide for the storage of 16 possible binary combinations using all four tracks. Therefore, at various progressive positions along the tracks, different binary characters may be stored to encode desired information. The storage of the binary information occurs at regular spaced intervals along the tracks so that the binary information is stored at discrete positions along the tracks.

In order to provide for the reproduction of the binary information stored on the credit card, a track of clock information is also located on the credit card, which track of clock information is parallel to the tracks of binary information. Specially, the center track is the clock track, but there is a smaller number of discrete positions for the clock information than for the binary information. Specifically, in a particular embodiment of the invention, for every other binary character there is one clock signal. The use of a smaller number of clock positions relative to the number of positions for the binary characters is to provide for positive clocking of the information and the elimination of flase clocking which might occur due to irregular motion of the card during reproduction.

The reproduction of the tracks of data and clock information on the credit card is accomplished using pairs of light-emitting and detector diodes. Specifically, one pair is used to read each of the four data tracks, and two pairs are used to read the single clock track. In addition, other pairs of diodes detect the leading edge of the card as it enters the card reader and the same edge of the card when it reaches the bottom of the card reader. Assuming that the four tracks of data have openings or spots spaced a particular distance along the tracks to represent the binary characters at successive positions, the clock track, as indicated above, would have an opening or spot for every other character.

The two pairs of diodes used for reading the clock track are spaced apart the same distance as that between the characters in the data tracks. Therefore, each one of the pair of diodes reads each of the clock signals so that the reproduction of the clock informaiton alternates between the two pairs of clock detector diodes. This alternation may be used to control a bistable flip-flop so that the output from one sensor sets the flip-flop and with the output of the other resetting the flip-flop.

This alternation of the flip-flop in accordance with the progressive reading of the clock information by the two pairs of clock sensors provides for the control of the reproduction of the information in the data tracks and also provides for the transmittal of this reproduced information for storage. Because of the positive bistable triggering of the flip-flop, the clock system will not alternate between states due to small variations in motion as the discrete clock areas cross the detection threshold of a sensor.

The actual emitter/detector pairs used to provide for reproduction of the information on the credit card may be operated in a pulse mode. For example, the light-emitting diodes that are used for the clock detection may be turned on every millisecond. When the card enters the reader, the light-emitting diodes that read both the data and the clock track are pulsed at this one-millisecond rate, and the detectors are also enabled only during the time that the emitters are pulsed. This reduces the probability of entering incorrect data.

The particular form of the credit card may be of the type disclosed in copending application Ser. No. 223,272 filed on Feb. 3, 1973, in the name of John R. Scantlin and assigned to the same assignee as the instant case. It is to be appreciated, however, that although the application is described with reference to a credit card, which may be of the type disclosed in the above-referenced copending application, the method and apparatus or storing and reproducing information may be provided on other types of credit cards or on other types of recording media.

Generally, the credit card is used as part of a credit authorization system which provides for inquiries into the status of a customer's credit and with a response to that inquiry which either authorizes or rejects the extension of credit for a particular transaction. Specifically, this inquiry and response are automatically accomplished by the use of the information encoded on the credit card, which encoded information is read automatically by the movement of the card past the emitter/detector sensors referred to above.

The information which is read may actually be stored within a terminal located at the point of the transaction, and this information may then be transmitted to a central computer at appropriate times through the use of a communications network. The inquiry as to the extension of credit may be responded to in accordance with the information stored in the computer as to the particular customer's credit and a response message may authorize or reject the extension of credit or may display additional information to deal with special situations. It is to be appreciated that with this type of system whereby credit authorization terminals would be located at a plurality of locations throughout a store, reliability and low cost are preeminent objectives in the design. It is therefore necessary that the storage of the information on the credit card be foolproof and difficult to duplicate, yet simple to read and reliable in readout.

In order to provide such a simple and reliable readout of the credit card, the information is encoded through the use of areas of transmissivity different from the surrounding areas of the card and with an optical readout of these areas of different transmissivity. Normally, the card is read by positioning the card relative to the readout mechanism and by dropping the card through a slot so that the information contained in the various tracks on the card passes by the readout sensors. The readout sensors, as indicated above, may be light-emitting diodes which generate radiation, such as infrared radiation, and with detectors such as diodes which are light-sensitive to detect the areas of different transmissivity on the card.

As indicated above, the data information is recorded in four data tracks to provide for a plurality of binary characters and with two data tracks located on each side of the clock track. The data, for example, may consist of an 11-character serial number and with each character separated by a distance of 180 mils. The distance between the clock data would be twice this, since there is one clock signal for every other character. In order to provide for a clock signal for every character, the pair of clock sensors spaced one character distance apart are used to alternately read the clock signals located every other character. The signals from the different clock sensors may be referred to as A and B clock signals, which A and B clock signals control a bistable flip-flop, which in turn is used to control the reproduction and storing of the encoded character information. This eliminates misinformation which may be reproduced due to jiggling of the card as it passes by the reproducing sensors, or even deliberate undesired movements of the card by the person positioning the card for reproduction.

The clock system noted above may be expanded to a clock signal for every third character and with three clock sensors, each located one row apart, so as to provide for A, B and C clock signals. This would completely eliminate any reproduction of improper signals since the proper A B C sequence would be necessary, and it would not be possible to provide such a sequence by moving the card in an improper direction.

A clearer understanding of the coding system and method of the present invention will be had with reference to the following description and drawings wherein:

FIG. 1*a* is a functional block diagram of the card reading logic; FIG. 1*b* is a timing diagram, and FIG. 1*c* is a typical time slot;

FIG. 2 illustrates an optically-encoded credit card incorporating the coding system of the present invention;

FIG. 3 schematically illustrates a card reader and shows the location of the sensors for the proper reading of the information on the card of FIG. 2;

FIG. 6 illustrates a timing diagram for the card reader and clock portion of FIGS. 4 and 5.

Figures 1A, 1B, 1C:
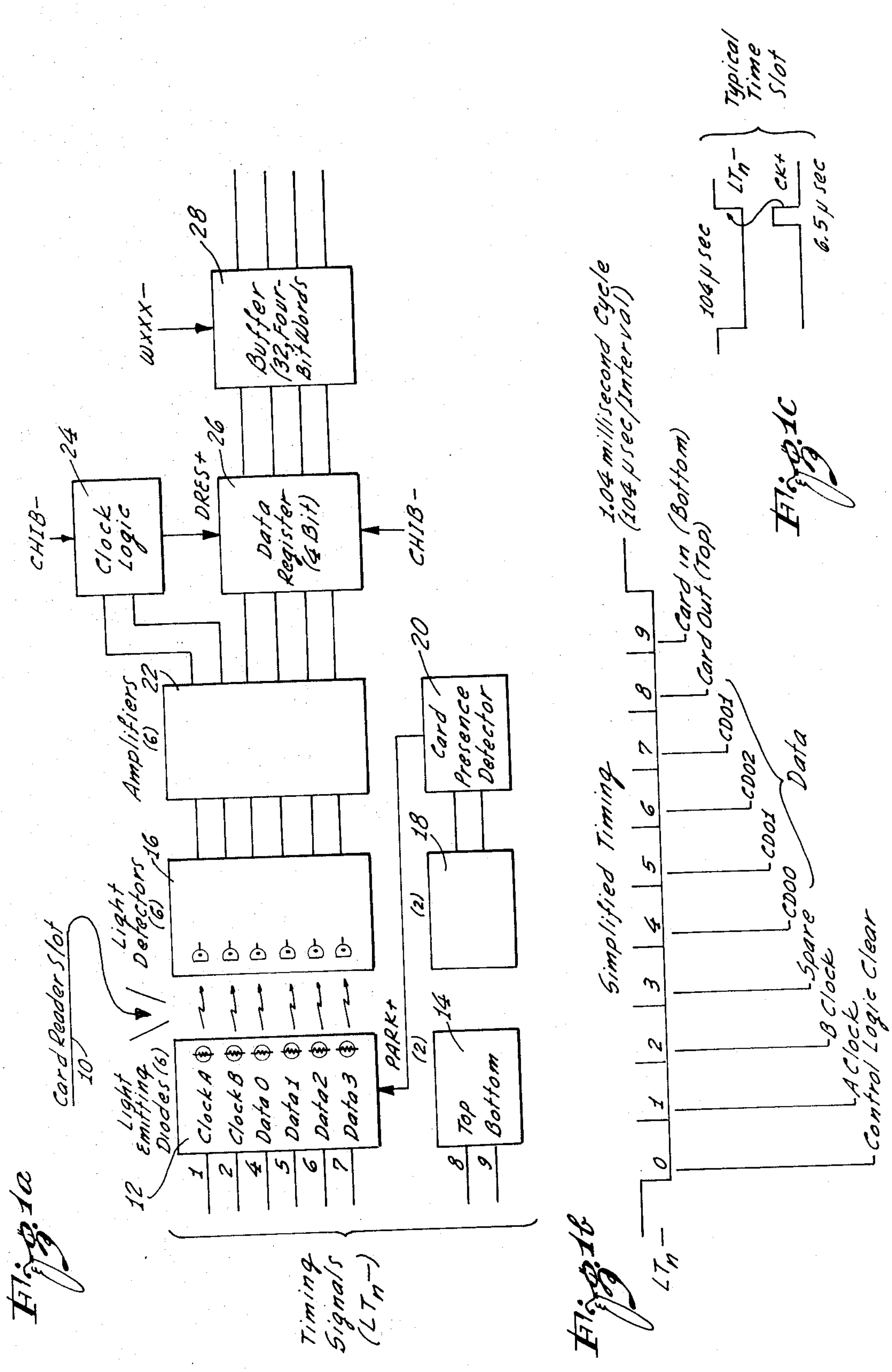

FIG. 1*a* illustrates a functional block diagram of the logic of the card reader system of the present invention, and FIG. 1*b* illustrates the timing sequence for various functions which are performed in the system of FIG. 1*a* through a single pulse cycle. In FIG. 1*a*, a card reader slot 10 is used to receive a credit card which has encoded data and clock information in a manner shown in FIG. 2. In order to read the encoded data and clock information and to detect the presence of the credit card, a plurality of pairs of light-emitting diodes and light detectors forming sensors, namely, eight in number, are used in the detection process. Specifically, the light sensors are a pair of clock sensors forming clock A and clock B signals and four data sensors forming data 0 to data 3. The aforementioned light sensors include six light-emitting diodes grouped together in a first block 12. The last two light sensors include light-emitting diodes grouped in a block 14 and are for the sensing of the top and bottom position of the card as it passes through the card reader slot 10.

A first group of light detectors 16 receives the information encoded on the card as determined by light from the light-emitting diodes in the group 12. A second group of two light detectors 18 receives information relative to the card entering the slot and coming to the bottom of the slot. Specifically, the information received by the sensors formed by the light-emitting diodes 14, and the light detectors 18 are used to provide signals to a Card Presence Detector 20. The card presence detector produces an output signal (PARK+), which PARK+ signal is used to activate the group of light-emitting diodes 12

The output signals produced by the light detectors in the group 16 are fed to a group of amplifiers formed as a group 22. The outputs from the amplifiers 22 are coupled to a Clock Logic 24 and a Data Register 26. Both the Clock Logic 24 and the Data Register 26 are controlled by the CHIB− signal, which is a signal which inhibits the reading of the card unless certain conditions are met. Assuming these conditions are met, the Data Register 26 is still inhibited from operating to receive data information and to pass on this data information until the Data Register also receives the DRES+ signal from the Clock Logic 24. The information transmitted from the Data Register 26 is coupled to a Buffer 28 to store the information until the Buffer 28 is polled by the computer-communications network, which does not form a part of this application.

In order to insure that the various operations described above with reference to the system of FIG. 1a are accomplished without any conflict at the proper times, specific actions are performed during different time slots of a complete pulse cycle. In particular, as shown in FIG. 1*b*, a complete cycle may have a time period of 1.04 milliseconds and with this basic cycle period subdivided into ten equal time slots designated LT 0 to LT 9. Specifically, in the LT 0 time slot, the system is checked to determine that the control logic is clear. The LT 1 and LT 2 time slots are used to sense the A and B clock signals, and the light-emitting diodes corresponding to the A and B clock detection are pulsed only during these time slots. LT 3 is a spare, unused time slot, and the LT 4 through LT 7 time slots are used to read the encoded data information on the credit card through the use of the data sensors. LT 8 and LT 9 are the time slots used to detect the position of the card as it enters the card reader slot and when it reaches the bottom of the card reader slot. FIG. 1*c* illustrates a typical time slot which has a period of 104 microseconds and wherein ten time slots constitute the complete pulse cycle. It can be seen that within the time slot shown in FIG. 1*c*, the actual clock pulse (CK+) occurs at the end and has a time period of 6.5 microseconds.

Figures 2, 3:
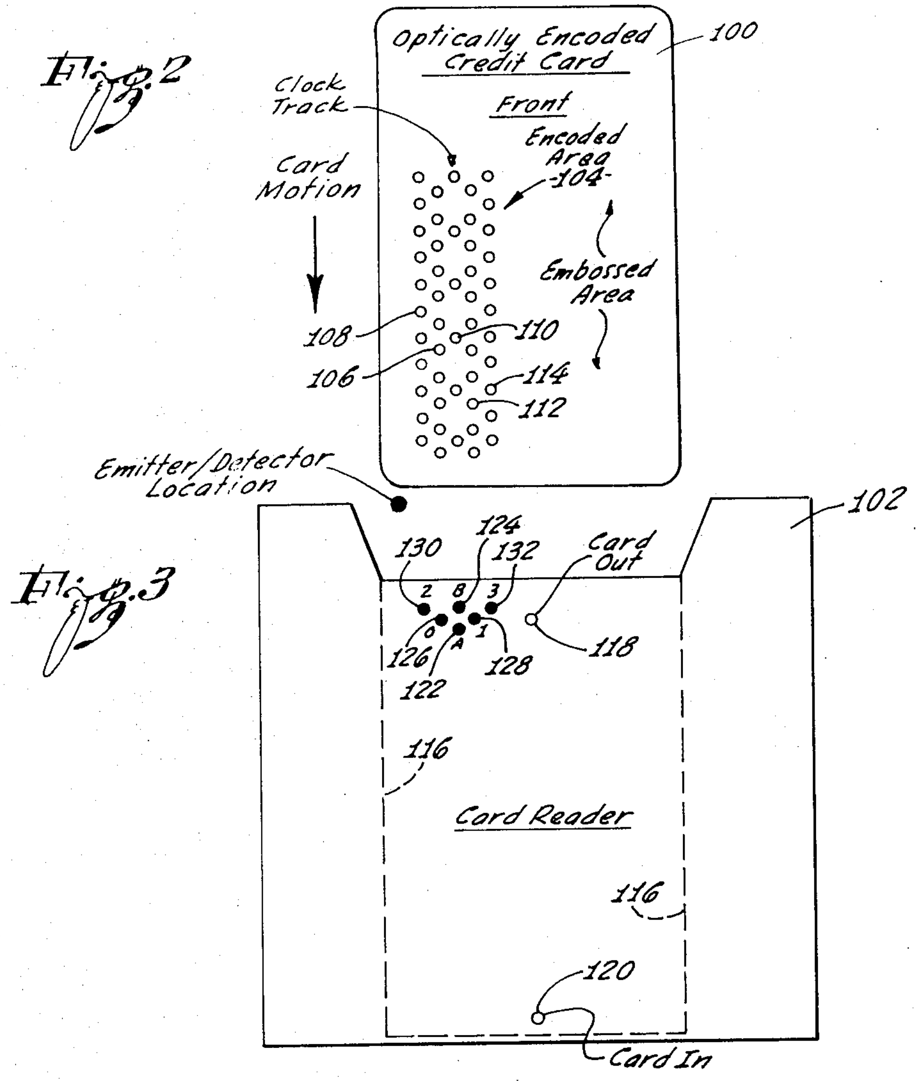

Referring now to FIGS. 2 and 3, an optically encoded credit card 100 is shown in FIG. 2 and with a Card Reader 102 shown in FIG. 3 to receive the optically encoded credit card 100. The credit card 100 includes an encoded area 104 which has five tracks of information designated 106 through 114. The center track 110 is the clock track and has one discrete area for every other character formed by the discrete areas in the other four tracks located to each side of the center track. The discrete areas may be areas of different transmissivity than the surrounding area and may be either higher or lower in transmissivity than the surrounding area. It will be noted that the discrete areas of the data track forming each character may be optionally offset from each other so as to maximize the size of the discrete area but still leave sufficient space between the discrete areas so as to differentiate between the areas.

For example, the discrete areas in each track are separated by a distance of 180 mils and, as indicated above, an entire character is made up of one bit from each of the four data tracks. The inside data tracks may be offset 90 mils from the outside data tracks so as to permit the tracks to be located on 130-mil centers with sufficient distance between discrete areas. Since the clock track areas are located at every other one of the data characters, the spacing between the clock track areas would be two times 180 mils, or 360 mils. It is to be appreciated, of course, that discrete areas are shown for all of the possible positions of the data tracks, but that for any particular binary character the specific discrete areas which are provided in the four data tracks for the particular character depend on the binary value of this character.

FIG. 3 illustrates the Card Reader 102 and, in particular, shows the slot 116 to receive the credit card 100. In addition, the location of the sensors for detecting the position of the card and the information encoded on the care are also shown. Specifically, sensor position 118 detects the leading edge of the card as it is moved through the card slot 116. The sensor 120 detects when the card is fully seated within the card slot 116. The sensor positions 122 and 124, which are marked A and B, are the clock sensors and are located one character distance apart and are used to read the clock areas on the card 100 in the center track 110. The sensor positions 126 through 132, marked 0, 1, 2, and 3, are the data sensors and are used to sense areas in the data tracks representing individual characters.

Figure 4:
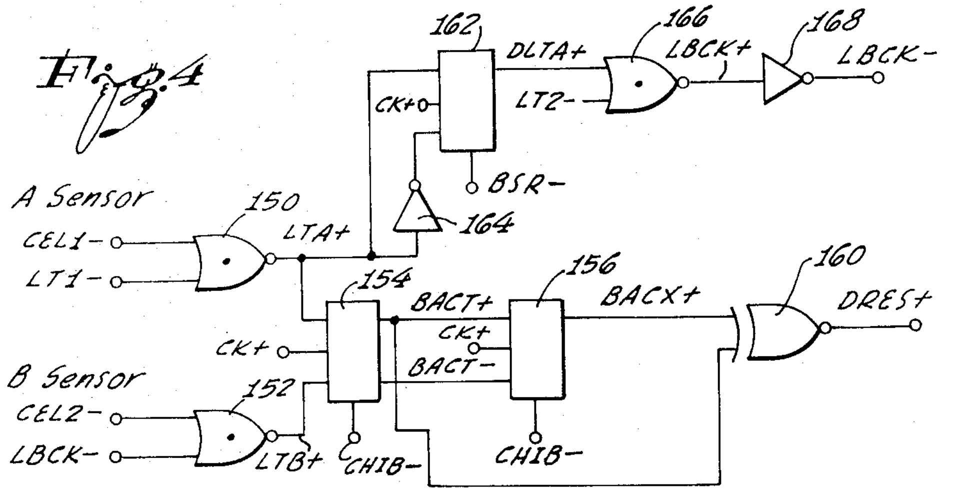
FIG. 4 illustrates a logic diagram of the clock portion of the reproducing system.
Figure 5:
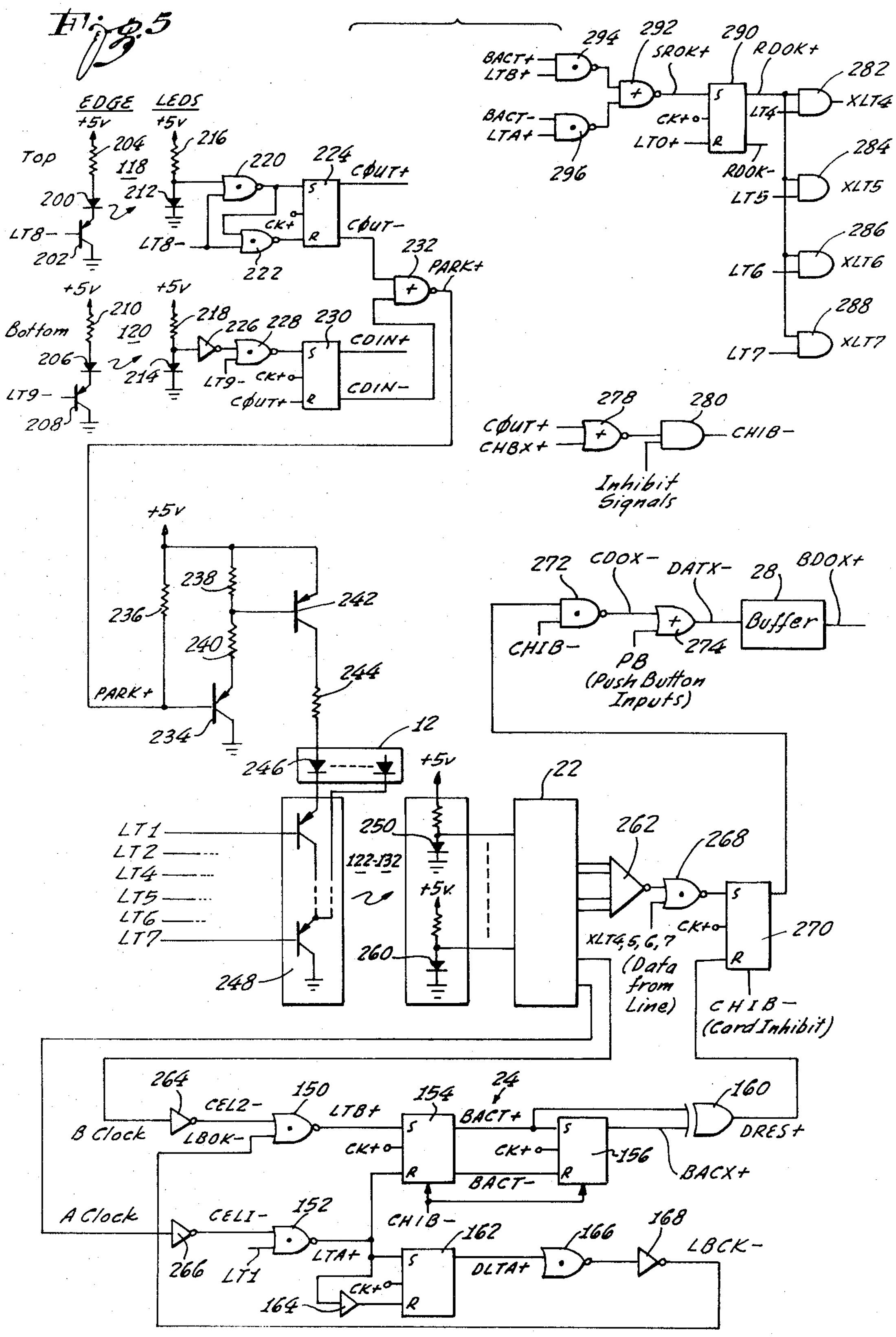
FIG. 5 illustrates a logic diagram of the entire card reader.

FIG. 4 illustrates the logic diagram for the clocking portion of the card reading system and the clocking portion of FIG. 4 is also included in the total card reading system of FIG. 5. Generally the use of a "." within a gate indicates that the gate is used to produce an "and" function. Also, the use of a "+" within a gate indicates that the gate is providing an "exclusive or" function. Finally, the use of a "+" within the gate indicates that the gate is providing an "exclusive or" function.

As indicated above, the clock track on the credit card is located between the data tracks and there is a discrete clock area for every other data character. The clock track is sensed using the pair of light-emitting diodes and sensing diodes designated as the A and B sensors and with the sensors located at positions 122 and 124 in FIG. 3. The purpose of the logic system of FIG. 4 is to detect a change in the clock state from an A to a B state, or a B to an A state, and with this change in state used to control various functions in the card reader. Generally, these functions are first to transfer the data currently stored in the Data Register 26 shown in FIG. 1*a* to be stored in the Buffer storage 28. Secondly, the Data Register 26 is to be cleared so as to store any new data which is reproduced by the light detectors shown in block 16 of FIG. 1.

The A and B clock sensors will detect A light and B light, and these names describe the state when a change in light is detected at a discrete clock area by the A sensor or the B sensor. The state of the A and B sensors designated as CEL1− and CEL2− is applied to a pair of NOR gates 150 and 152. The other input to the gate 150 is a timing signal LT 1− and the input to the gate 152 is a second timing signal LBCK− which is derived from the timing signal LC2− in a manner to be described. The output from the NOR gates 150 and 152 is applied to a first register 154 which is a J-K master-slave type of flip-flop and which has a further control from the clock signal CK− also shown as an input to the flip-flop 154. In addition, the flip-flop 154 receives the CHIB− signal described with reference to FIG. 1a which is used to clear the first clock register 154.

The output from the first clock register 154 is applied to a second clock register 156, which is similarly a J-K master-slave type of flip-flop. The flip-flop 156 also receives a clock signal CK+ and a CHIB− signal which at the appropriate times are used to clear the flip-flop 156. The BACX+ signal from the register 156 and the BACT+ signal from the register 154 are used as inputs to the exclusive OR gate 160. The output from the exclusive OR gate 160 is the DRES+ signal which indicates that valid information is present in data register 26 and further causes that information to be entered in buffer 28 in a manner to be described.

In addition to the production of the DRES+ signal, the clock logic of FIG. 4 also includes the production of the LBCK− signal which is used as one input to the NOR gate 152. Specifically, the output from the NOR gate 150, which is the LTA+ signal, is applied directly as one input to a J-K master-slave flip-flop 162 and a second input to the J-K master-slave flip-flop 162 through an inverter 164. The DLTA+ output from the flip-flop 162 is applied as one input to a NOR gate 166 and the second input to the NOR gate 166 is provided by the timing signal LT2−. The output from the NOR gate 166 as inverted by inverter 168 is the signal LBCK− which is applied to the NOR gate 152.

It can be seen, therefore, that the NOR gate 152 will only operate when receiving the LBCK− signal to thereby reset the flip-flop 154 at the end of the LT2 period. This setting, however, is conditional on receiving the DLTA+ signal which would inhibit the recognition of a B block signal at the LT2 time if an A clock occurred at LT1 time of the same scan cycle. The principal function of this portion of the system is to detect (and reject) a card that does not have the areas of different transmissivity. When this occurs, an A clock pulse would set the flip-flop 162 to thereby inhibit the switching of the flip-flop 154 to the B state.

FIG. 5 illustrates a complete logic diagram for a card reader which incorporates the clock logic of FIG. 4. As can be seen in FIG. 5, the light-emitting diodes at locations 118 and 120 (shown in FIG. 3) are used to detect the end of the card as it enters the slot and when it reaches the bottom. Specifically, a light-emitting diode 200 is controlled by a transistor 202 so as to provide for the application of current through the light-emitting diode 200 and a bias resistor 204. The transistor is actuated by the timing signal LT8−. The edge of the card readhing the bottom position is detected in a similar way using light-emitting diode 206, transistor 208 and resistor 210 and with the clock signal LT9− applied to control the transistor 208.

Light is transmitted from the light-emitting diodes 200 and 206 to complementary detector diodes 212 and 214 at the appropriate times. The diodes 212 and 214 are biased by current from voltage sources through resistors 216 and 218. The output from the detector 212 is applied to NOR gate 220 which has as its second input a timing pulse LT8−. The output from the NOR gate 220 is applied as an input to a second NOR gate 222 which also receives an input timing pulse LT8−, and the output of the NOR gates 220 and 222 are applied as inputs to a flip-flop 224. The flip-flop 224 may be of the J-K master-slave type and also include as inputs a clock signal and also a clearing signal BSR−.

The output from the detector 214 is applied through an inverter 226 as a first input to a NOR gate 228 which has as its second input a timing signal LT9−. The output from the NOR gate 228 is applied as an input to a J-K master-slave flip-flop 230 which also includes a clock input and a BSR-clearing signal. The CDUT− and CDIN− outputs from the flip-flops 224 and 230 are applied as inputs to a NAND gate 232 to produce the PARK+ signal.

The PARK+ signal is used to control the application of power to the light-emitting diodes used to read the tracks of encoded data information and the clock track. Specifically, the PARK+ signal is applied to a transistor 234, which transistor has its base biased by current through a resistor 236. The output of the transistor 234 is coupled from a voltage divider, including resistors 238 and 240, to the base of the transistor 242. The transistor 242 in turn provides for the application of power through a resistor 244 to a plurality of light-emitting diodes represented by single light-emitting diode 246. Actually, there are six light-emitting diodes in number, which constitute the six diodes indicated to be present within the block 12. These six diodes are positioned as shown in FIG. 3 at positions 122 through 132 so as to read the data tracks and the clock track. The single diode 246 is shown as illustrative of the remaining diodes and the circuitry would be similar for all of the diodes.

The application of power to the diodes is controlled by clock signals LT1, 2, 4, 5, 6 and 7 which are shown to be applied to a plurality of transistors located within the block 248. The output information representative of the data information and clock information on the various informational tracks on the credit card is detected by corresponding detectors represented by the detectors 250 through 260. The outputs of these detectors is applied to the plurality of amplifiers as shown within the block 22. The outputs of the amplifiers within the block 22 would be six signals, four of which represent the data information and are applied to a plurality of inverters represented by the single inverter 262 and two of which are the A and B clock signals, each individually applied to inverters 264 and 266. The remaining portions of the clock logic is as shown in FIG. 4 and it will not be repeated at this time.

The data information from the inverter 262 is applied to a NOR gate 268, which is representative of four such NOR gates, and with the second input to the NOR gates being the timing signals XLT4, 5, 6 and 7 which are derived from the timing signals LT4, 5, 6 and 7. The output from the inverter 268 is applied as a first input to a J-K master-slave flip-flop 270, which is representative of four such flip-flops, and with the DRES+ signal from the clock logic as the second input to the flip-flop 270. A clock signal and a CHIB− signal is also applied to the flip-flop 270. The output from the flip-flop is applied to a NAND gate 272 which is representative of four such NAND gates and with the CHIB− signal applied as a second input to the NAND gate 272. The output from the NAND gate 272 is applied to an OR gate 274, which is representative of four such OR gates. A second input to the OR gate 274 may be pushbutton inputs from a keyboard which would bypass the automatic reading of the card and allow for a manual input of information. The outputs from all of the OR gates 274 are applied as data inputs to be stored in the Buffer 28.

The CHIB− signal referred to above is produced from a pair of signals COUT+ and CHBX+ applied to a NOR gate 278. The output from this NOR gate 278 is applied to an AND gate 280 which has as a second input various inhibit signals so as to produce the CHIB− signal.

The timing signals XLT4 – XLT7 are produced from a plurality of AND gates 282–288. The AND gates 282–288 have as inputs the timing signals LT4 – LT7 and an output signal RDOK+ from a flip-flop 290. The inputs to the flip-flop 290 are a reset signal LTO+ and an output signal SROK+ from a NAND gate 292. The inputs to the NAND gate 292 are the output from a pair of NAND gates 294 and 296. The inputs to the NAND gates 292 and 294 are the BACT+ and BACT− signals and the clock signals LTB+ and LTA+.

FIG. 6 illustrates a timing diagram for the card reader of FIG. 5 and illustrates the production of the various signals noted on FIGS. 4 and 5 and which will be helpful in the understanding of the operation of the system. Assuming, first, that there is no card in the reader, the card reading logic is initiated by the signal CHIB− which is low when the card reader is prevented from reading a card. A card is now inserted into the reader. There are various conditions which would prevent the reading of a card which are not part of this system and generally these would occur when the terminal is off the line; when there is a relatively high amount of traffic from other terminals; when the terminal has been selected to write information previously requested; or, when there is a special Erase signal which occurs from the remaining portion of the communications network. All of these signals may be seen as a single input to the gate 280 which provides for the signal CHIB− to be low.

Assuming that the system is not prevented from reading a card for the reasons indicated above, the CHIB− signal will go high when the COUT+ signal goes low. The COUT+ signal goes low when the top card edge detector senses the entry of a card into the reader. The edge of the card is sensed by the diode pair 200 and 212 shown in FIG. 5 which form such a card edge detector. The CHIB− signal while in its low state clears the two flip-flops 154 and 156. These flip-flops, as shown in FIGS. 4 and 5, are connected as a two-bit serial entry shift register and are used to detect a change in the state of the signals which are used to clock the reproduction of the data characters from the card.

When the COUT+ signal goes low, this also causes the PARK+ signal, as shown in FIG. 6, to go high. The PARK+ signal is used to enable the pulsing of all of the light-emitting diodes used for sensing encoded information on the card and therefore including all of the diodes shown in the block 12 of FIG. 1*a*. As shown with reference to FIG. 1*b*, each of the light-emitting diodes is only pulsed during a particular time slot which forms a part of the entire scan cycle.

As indicated above, initially the CHIB− signal cleared the clock registers 154 and 156 to the low state. That is equivalent to the A state since this is the state when the registers are responsive to the A clock sensor sensing the presence of a clock area on the clock track of the card When the leading edge of the card enters the reader, as shown in FIG. 3, the clock sensor B at the position 124 and the data sensors 2 and 3 at the positions 130 and 132 are covered by the leading edge of the card before the COUT− signal activates the various light-emitting diodes and detectors used to read the clock and data tracks.

After the COUT− signal activates the light-emitting diodes and sensors, the data sensors 0 and 1 at positions 126 and 128 may detect light pulses before they are covered by the edge of the card. The A clock sensor shown at position 122 will normally detect light pulses before it is covered by the card. In order to insure that this does not disturb information in the data register, the data register is preset with a particular code (iou) by the CHIB signal. The data sensor locations and specifically the locations 0 and 1 are chosen so that, even though they may detect light pulses before they are covered by the card edge, this would not change the present information in the data register. This is because the data sensors 0 and 1 correspond to the portions of the preset code which are already in the position, so that the reception of light by the sensors would not change this preset code.

As the card continues to slide into the reader slot, the B clock sensor detects the first clock area. The data sensors at this time may detect data pulses, but they are ignored since the RDOK signal at the output of flip-flop 290 has not gone positive to provide for the gating of the detector amplifier output from the inverter 262 into the data register 270 by the timing signals XLT4, 5, 6 and 7.

The output from the B clock sensor sets the flip-flop 154 at the end of the LT2 time period. This setting is conditional of the DLTA+ signal. The DLTA+ signal inhibits the recognition of a B clock signal at the LT2 time period if an A clock occurred at the LT1 time period of the same scan cycle. The principal function of the DLTA+ signal is to detect a card that is transparent to the emitter-sensor pairs. This DLTA+ signal also insures that there is a minimum of one scan cycle between a change from the A state to the B state. This is also true of a case of a B to A state change, but this occurs because the B clock is sampled after the A clock.

When the BACT+ signal from the flip-flop 154 goes positive, the DRES+ signal goes positive. The DRES+ signal is the Data Reset Signal that occurs whenever a transition is detected from the B state to the A state, or vice versa. The DRES+ signal is the output signal from the exclusive OR gate 160 which has as its input the BACT+ signal and the BACX+ signal. Since the flip-flop 156 which produces the BACX+ signal is connected as a shift register with the flip-flop 154, the BACX+ signal is connected as a shift register with the flip-flop 154, the BACX+ signal goes positive at the next clock transition. The DRES+ signal is therefore a positive pulse of one time slot duration (104 microseconds) which occurs in the time slot following the detection of a clock transition.

The DRES+ signal is used to transfer the contents of the data registers 270 to the buffer storage 28, and such transfer occurs part way through the time slot. At the falling edge of the DRES+ signal, the data register 270 is cleared. When the first B clock signal is detected, the preset card reading code which was placed in the register by the CHIB− signal is transferred from the data register to the buffer storage 28. The data register is cleared and the READ signal RDOK enables the sampling of the photosensitive outputs for reading the first data character from the card.

As the data information is detected by the sensors, the corresponding bits of the data register are set. The first pulse detected sets the bit so that minor variations at the detection threshold will not cause problems. At the normal speed for the movement of the card through the slot, several pulses will be caused by each clock and data area. The limiting case is the clock track since two clock pulses must be detected for each clock cycle. However, for normal card velocities, there will be a number of pulses detected for each area in the card representing both data and clock signals.

The detection of the A clock signal at the LT1 time slot causes the signal BACT+ to go low. The flip-flops 154 and 156 which produce the signals BACT+ and BACX+ are now in different states and the resulting DRES+ signal gates the data character assembled during the previous scan cycle which occurred during the B clock and with this assembled data character now gated to the buffer storage 28. As indicated above, the data register has been cleared. The alternating cycle from A clock detection to B clock detection to A clock detection, and so on, continues until all eleven characters are read from the card and stored in the buffer. The completion of the reading process is caused by the signal CDIN+, which is a positive logic level that occurs when the leading edge of the card obstructs the light-emitting diode 206 which forms with the detector 214 the bottom sensor. This sensor determines when the card has reached the bottom of the card reader slot.

The method and apparatus of the coding system of the present invention provides for the encoding of information on a recording medium such as a credit card and with this information reliably read by a card reader. The use of a clock track which contains a clock signal for every other one of the data characters, and with a pair of clock sensors to provide for a clocking signal produced by the alternation between the A and B clock sensors to increase the reliability of the system and provide for a simple self-clocking of the data characters on the card. Although the card may be jiggled in its movement during reproduction, this will not normally affect the reading of the data characters since the alternation of the clocking prevents false reading. In addition, the actual reading of the data information does not occur until there is a positive clocking signal so that problems caused by transition periods from no light to light conditions is overcome. Also, the actual reading occurs at a particular point in the scan cycle and with the number of such readings occurring for each clock and data signal. This insures the proper reading of the data character even if an initial reading was not proper. This also eliminates the problem of skew since it is not necessary for all of the data characters to be read at the same time, since each bit in the data character is serially read a number of times to provide for high reliability in the ultimate reading cycle.

Although the invention has been described with reference to a particular embodiment, it is to be appreciated that various adaptations and modifications may be made and the invention is only to be limited by the appended claims.

I claim:

1. An article of manufacture for storing data information and clock information for reproduction by first means which reproduces and stores the data information and by second means, including at least a pair of sensors, coupled to the first means and responsive to the clock information which second means controls the reproduction and storage of the data information by the first means in accordance with the sensing of the clock information to have the data information at one position reproduced by the first means in response to the sensing of particular clock information by a first one of the pair of sensors and to have the same data information at the one position stored by the first means in response to the sensing of the same particular clock information by the second one of the pair of sensors, and with the article of manufacture including, a recording medium for receiving the data information and the clock information, first means forming at least a first track on the recording medium for storing the data information at first predetermined intervals along the first track on the recording medium, and second means forming a second track on the recording medium for storing the clock information at second predetermined intervals along the second track on the recording medium and with the second predetermined intervals occurring no more than every other one of the first predetermined intervals and with the second predetermined interval a multiple of the first predetermined interval.

2. The article of manufacture of claim 1 wherein the data information and the clock information is stored on the recording medium in the form of first areas having a different transmissivity than second areas of the recording medium.

3. The article of manufacture of claim 1 wherein the first and second tracks are parallel.

4. The article of manufacture of claim 1 wherein the data information is stored along a plurality of parallel tracks and with the information stored in binary form.

5. The article of manufacture of claim 1 wherein the recording medium is a credit card and the data information and the clock information is stored on the card in parallel tracks in the form of first areas of different transmissivity than the remaining area of the card.

6. The article of manufacture of claim 5 wherein the first areas on adjacent tracks form discrete characters and with the first areas in adjacent tracks offset from one another.

7. The article of manufacture of claim 1 wherein the first and second predetermined intervals form discrete positions along the first and second tracks and wherein there is one discrete position representing clock information for two discrete positions representing the data information.

8. A method of storing encoded data information and clock information on a recording medium for reproduction by reproducing and storing the data information and by reproducing the clock information using at least a pair of sensors and with the alternate reproduction of the clock information by the pair of sensors at periodic clock information positions controlling the reproduction and storage of the data information at periodic data information positions, including the following steps:

forming at least a first track on the recording medium and storing the encoded data information at first predetermined intervals along the first track on the recording medium, forming a second track on the recording medium and storing the clock information at second predetermined intervals along the second track on the recording medium, and providing the second predetermined intervals at a multiple of and at least every other one of the first predetermined intervals.

9. The method of manufacture of claim 8 wherein the second predetermined intervals are provided every other one of the first predetermined intervals.

* * * * *